United States Patent
Sowers et al.

(10) Patent No.: US 8,251,291 B2
(45) Date of Patent: Aug. 28, 2012

(54) ROTATIONAL BAR CODE ORIENTATION SENSOR

(75) Inventors: James P. Sowers, Largo, FL (US); Joseph P. Ferrara, New Port Richey, FL (US); John Ryan Parry, Safety Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 586 days.

(21) Appl. No.: 12/416,261

(22) Filed: Apr. 1, 2009

(65) Prior Publication Data

US 2010/0252632 A1   Oct. 7, 2010

(51) Int. Cl.
  *G06K 7/10*   (2006.01)
  *G06K 19/06*  (2006.01)
(52) U.S. Cl. ......... 235/462.03; 235/462.01; 235/462.43; 235/494
(58) Field of Classification Search ............... 235/462.01–462.49, 494
See application file for complete search history.

(56) References Cited

U.S. PATENT DOCUMENTS

| | | | |
|---|---|---|---|
| 4,901,073 A | 2/1990 | Kibrick | |
| 5,030,978 A * | 7/1991 | Stoneham et al. | 396/207 |
| 5,032,854 A * | 7/1991 | Smart et al. | 396/207 |
| 5,088,144 A * | 2/1992 | Schneider | 15/1.51 |
| 5,159,560 A | 10/1992 | Newell et al. | |
| 5,576,528 A * | 11/1996 | Chew et al. | 235/469 |
| 5,852,413 A | 12/1998 | Bacchi et al. | |
| 6,459,389 B1 | 10/2002 | Germuth-Loffler et al. | |
| 6,550,685 B1 * | 4/2003 | Kindberg | 235/494 |
| 6,646,616 B2 | 11/2003 | Tietjen | |
| 7,255,199 B2 * | 8/2007 | Ishiwata | 186/49 |
| 2004/0015323 A1 | 1/2004 | Boyton | |

OTHER PUBLICATIONS

Lu et al., "Barcode-based position control servo for high-speed conditions", "Frontiers of Electrical and Electronic Engineering in China", 2007, pp. 186-191, vol. 2, No. 2, Publisher: Higher Education Press and Springer-Verlag, Published in: China.

* cited by examiner

*Primary Examiner* — Tuyen K Vo
(74) *Attorney, Agent, or Firm* — Fogg & Powers LLC

(57) ABSTRACT

A rotational bar code is presented. The rotational bar code includes a structure at least a portion of which includes a cylindrical surface having at least one of an outward-facing surface and an inward-facing surface, and a plurality of vertically-oriented symbols horizontally abutted in a non-periodic unique pattern on one of the outward-facing surface or the inward-facing surface. The surfaces are radially disposed about a rotational axis of the cylindrical surface. The vertically-oriented symbols are unique for at least a predefined segment of an arc of the cylindrical surface. An angular orientation of the cylindrical surface is identifiable based on the plurality of vertically-oriented symbols.

18 Claims, 7 Drawing Sheets

ROTATIONAL BAR CODE ORIENTATION SENSOR

BACKGROUND

Many devices rotate or pan but do not provide a way to accurately determine the orientation of the device with an arc. For example, the orientation of an optical axis of a camera attached to a rotatable platform cannot be accurately determined nor can the angular orientation of the rotatable platform be accurately determined.

SUMMARY

The present application relates to a rotational bar code. The rotational bar code includes a structure at least a portion of which includes a cylindrical surface having at least one of an outward-facing surface and an inward-facing surface, and a plurality of vertically-oriented symbols horizontally abutted in a non-periodic unique pattern on one of the outward-facing surface or the inward-facing surface. The surfaces are radially disposed about a rotational axis of the cylindrical surface. The vertically-oriented symbols are unique for at least a predefined segment of an arc of the cylindrical surface. An angular orientation of the cylindrical surface is identifiable based on the plurality of vertically-oriented symbols.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
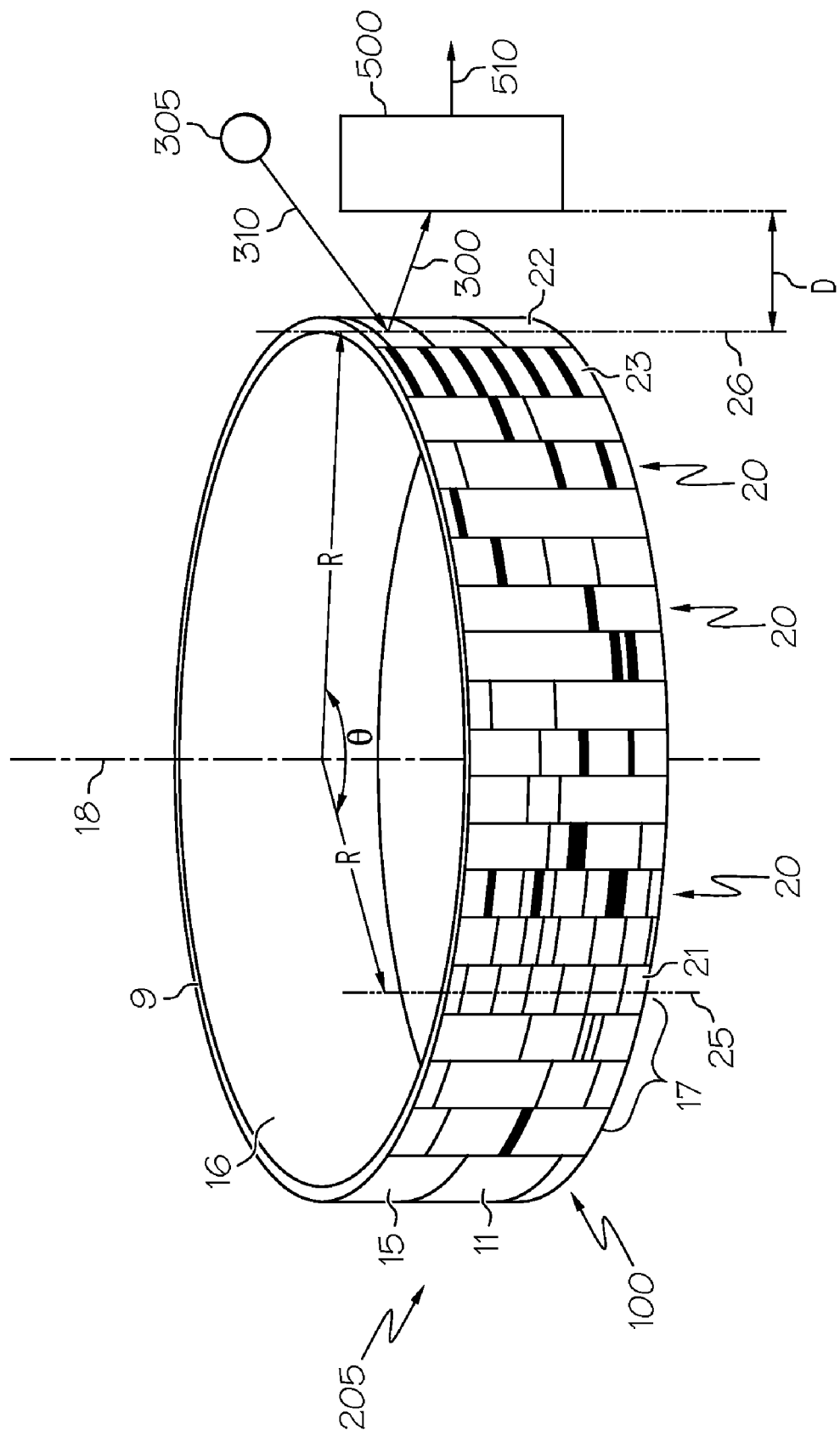
FIG. 1 is an illustration of an embodiment of a rotational bar code and bar code scanner in accordance with the present invention.

FIG. 1 is an illustration of an embodiment of a rotational bar code 100 and bar code scanner 500 in accordance with the present invention. The rotational bar code 100 includes a structure 9 having a cylindrical surface 11 with an outward-facing surface 15 and an inward-facing surface 16. The outward-facing surface 15 and the inward-facing surface 16 are radially disposed about a rotational axis 18 of the cylindrical surface 11. A plurality of vertically-oriented symbols 20 are horizontally abutted in a non-periodic unique pattern represented generally as 205 on the outward-facing surface 15. The vertically-oriented symbols 20 are unique for at least a predefined segment of an arc 17 of the cylindrical surface 11. A light source 305 is positioned to emit light 310 that is directed to be incident on at least a portion (referred to herein as a "currently-read vertically-oriented symbol 22") of the rotational bar code 100. The light 300 reflected from the currently-read vertically-oriented symbol 22 is directed to the bar code scanner 500. A single ray of the light emitted by the light source 305 shown in FIG. 1 is representative of a full beam of light emitted by the light source 305. The beam of light from the light source 305 is directed (in some embodiments, via lenses or other beam-directing components) to be incident on the complete vertical extent of at least one vertically-oriented symbol 20. The cylindrical surface 11 of rotational bar code 100 has a radius "R."

The bar code scanner 500 is positioned to sense at least a portion of the light 300 reflected from the cylindrical surface 11 and to output data 510 indicative of at least one of the plurality of vertically-oriented symbols 20 from which the light 310 is reflected. As shown in FIG. 1, the bar code scanner 500 reads the reflected light 300, analyzes the image of the currently-read vertically-oriented symbol 22, and outputs data 510. The output data 510 comprises at least one of pulse width modulated data, resistive level data, voltage level data, and serial data indicative of a single vertically-oriented symbol 20. In one implementation of this embodiment, the bar code scanner 500 reads two adjacent currently-read vertically-oriented symbols 22 and 23 and the output data 510 comprises parallel digital data indicative of the two adjacent currently-read vertically-oriented symbols 22 and 23.

An angular orientation $\theta$ of the cylindrical surface 11 of the rotational bar code 100 is identifiable based on which one (or more) of the plurality of vertically-oriented symbols 20 is (are) read, and based on the pattern of the plurality of vertically-oriented symbols 20. The angular orientation $\theta$ of the cylindrical surface 11 is defined herein as the angle subtended between a currently-read vertically-oriented symbol 22 and a calibrated vertically-oriented symbol 21. The angle $\theta$ is subtended between a center line 25 of the calibrated vertically-oriented symbol 21 on the rotational bar code 100 and a center line 26 of the currently-read vertically-oriented symbol 22, which is currently being read by the bar code scanner 500. As shown in FIG. 1, the currently-read vertically-oriented symbol 22 and a calibrated vertically-oriented symbol 21 are separated by fourteen (14) intervening vertically-oriented symbols 20 so the separation between the center line 25 of the calibrated vertically-oriented symbol 21 and the center line 26 of a currently-read vertically-oriented symbol 22 is fourteen (14) times the width "W" of the vertically-oriented symbols 20. Thus, an arc with length of 14 W between the center line 25 of the calibrated vertically-oriented symbol 21 and the center line 26 of the currently-read vertically-oriented symbol 22 is subtended by the angle $\theta$ and the equation $14W = R\theta$ is satisfied. A single vertically-oriented symbol 20 is subtended by the angle $\theta_{single} = W/R$. Thus, the resolution (in length/radian) of the angular orientation of the rotational bar code 100 equals W/R. When the rotational bar code 100 is used in applications that require fine resolution, the width W of each vertically-oriented symbol 20 is decreased and/or the radius R is increased.

In one implementation of this embodiment, the vertically-oriented symbols 20 are imprinted on the outward-facing surface 15 and/or the inward-facing surface 16 (e.g., by printing with ink or dye, or by etching, scribing). In another implementation of this embodiment, the rotational bar code 100 is formed from a transparent material (such as a transparent polymer or glass) and the vertically-oriented symbols 20 are embedded in the rotational bar code 100 between the outward-facing surface 15 and the inward-facing surface 16 using one of various techniques known in the art to change the index of refraction of material inside the transparent material (e.g., by including dopants and/or implementing photon induced refractive changes).

Figure 2:
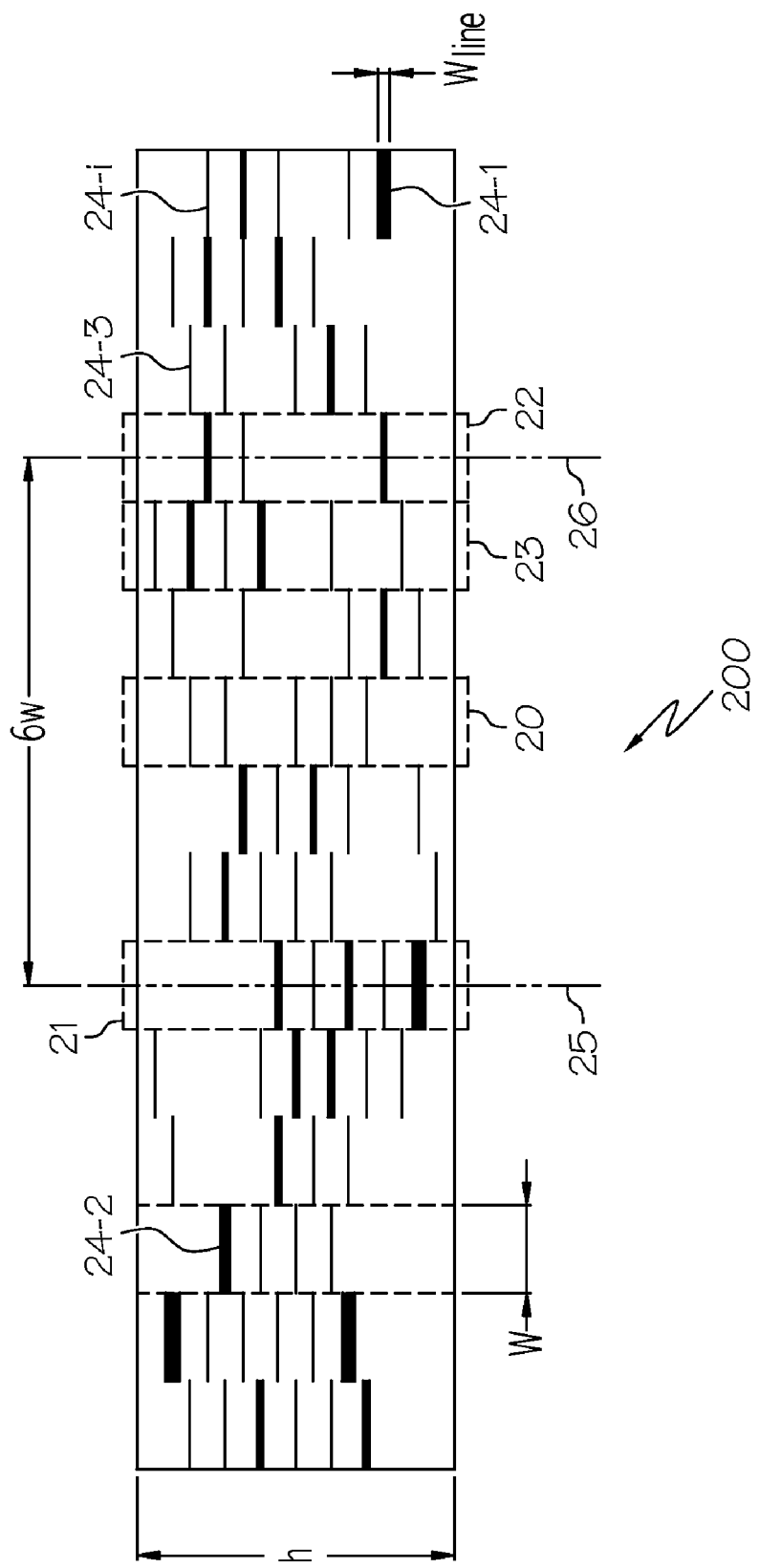
FIG. 2 is an exemplary non-periodic unique pattern in which every one of the plurality of vertically-oriented symbols is unique.

FIG. 2 is an exemplary non-periodic unique pattern 200 in which every one of the plurality of vertically-oriented symbols 20 is unique. In this case, the predefined segment of an arc 17 (FIG. 1) of the cylindrical surface 11 for which vertically-oriented symbols 20 are unique is 360 degrees or the complete cylindrical surface 11. The non-periodic unique pattern 200 is shown on a flat surface for ease of viewing. The height of each vertically-oriented symbol 20 is "h" and the width of each vertically-oriented symbol 20 is "W." Each vertically-oriented symbol 20 comprises at least one horizontal line segment represented generally at 24-$i$. The length of each $i^{th}$ horizontal line segment 24-$i$ equals the width W of the vertically-oriented symbol 20. Each horizontal line segment 24-i has one of a plurality of widths (also referred to as thicknesses). As shown in FIG. 2, the horizontal line segment 24-1 (having a width (thickness) $W_{line}$) is wider (thicker) than the horizontal line segment 24-2, which is wider (thicker) than the horizontal line segment 24-3. Since every one of the plurality of vertically-oriented symbols 20 is unique in the non-periodic unique pattern 200, only one bar code scanner 500 is required to accurately determine the angular orientation θ of the cylindrical surface 11 (FIG. 1) on which the non-periodic unique pattern 200 is printed or otherwise imposed.

As shown in FIG. 2, the currently-read vertically-oriented symbol 22 and a calibrated vertically-oriented symbol 21 are separated by five (5) intervening vertically-oriented symbols 20 so the separation between the center line 25 of the calibrated vertically-oriented symbol 21 and the center line 26 of a currently-read vertically-oriented symbol 22 is six (6) times the width "W" of the vertically-oriented symbols 20. Thus, if the non-periodic unique pattern 200 of FIG. 2 is on a cylindrical surface 11 that has a radius R', then an arc that extends from the center line 25 of the calibrated vertically-oriented symbol 21 to the center line 26 of the currently-read vertically-oriented symbol 22 is subtended by the angle θ' according to 6 W=R'θ'.

In one implementation of this embodiment, the light source 305, the bar code scanner 500, and the rotational bar code 100 are positioned relative to each other so that only one of the vertically-oriented symbols 20 is completely (or almost completely) scanned at any given time. In another implementation of this embodiment, the light source 305, the bar code scanner 500, and the rotational bar code 100 are positioned relative to each other so that two of the vertically-oriented symbols 20 and 23 are completely (or almost completely) scanned at any given time. In yet another implementation of this embodiment, the bar code scanner 500 is adjustably configured with respect to the rotational bar code 100. As the bar code scanner 500 is moved closer to the rotational bar code 100 (i.e., the distance D shown in FIG. 1 decreases) the number of vertically-oriented symbols 20 within the field of view of the bar code scanner 500 decreases.

Figure 3:
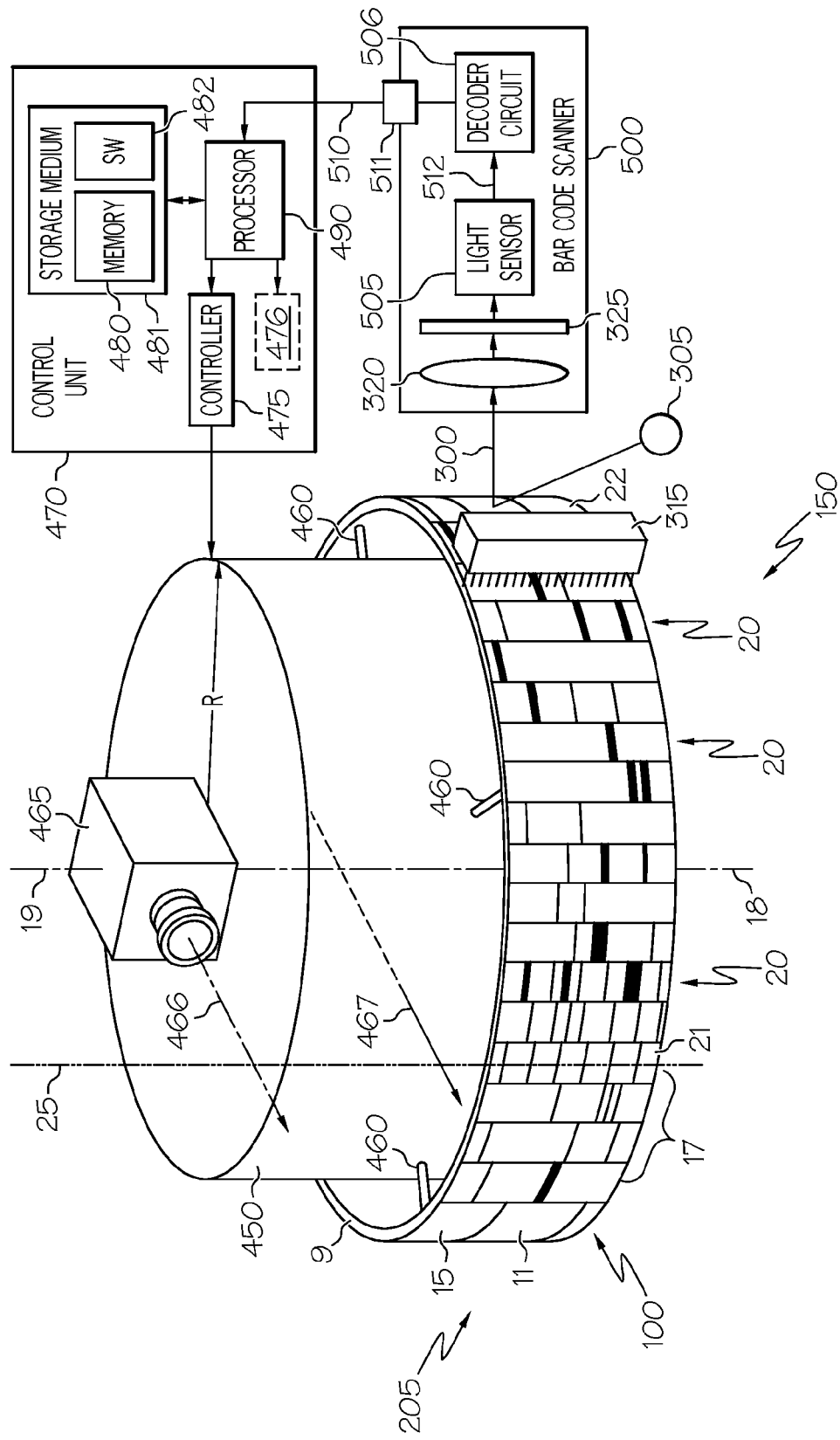
FIG. 3 is an illustration of an embodiment of a rotational-bar-code-sensor system in accordance with the present invention.

FIG. 3 is an illustration of an embodiment of a rotational-bar-code-sensor system 150 in accordance with the present invention. The rotational-bar-code-sensor system 150 includes a light source 305, rotational bar code 100, a rotatable structure 450, a camera 465, a bar code scanner 500, and a control unit 470. The light source 305 emits light 300 onto at least the vertically-oriented symbol 22 currently being read by the bar code scanner 500, which is referred to herein as the "currently-read vertically-orientated symbol 22." The rotational bar code 100 has a plurality of vertically-oriented symbols 20 horizontally abutted in a non-periodic unique pattern (e.g., the non-periodic unique pattern of FIG. 2) on a surface (e.g., outward-facing surface 15) of a cylindrical surface 11.

The rotational bar code 100 is immovably positioned on a rotatable structure 450 so that the rotational axes 18 of the rotational bar code 100 and the rotational axes 19 of the rotatable structure 450 are aligned. Specifically, the rotational axis 19 of the rotatable structure 450 is parallel to and overlapping the rotational axis 18 of the rotational bar code 100. In one implementation of this embodiment, rotational bar code 100 is immovably positioned on a rotatable structure 450 by being imprinted on a surface of the rotatable structure 450 (e.g., printing with ink or dye, etching, and/or scribing). In another implementation of this embodiment, the rotational bar code 100 is immovably positioned on a rotatable structure 450 by securing the rotational bar code 100 to the rotatable structure 450 with attachment components 460. The attachment components 460 can be screws and/or brackets.

When the rotational bar code 100 is immovably positioned on the rotatable structure 450, the rotatable structure 450 has an axis 467 that perpendicularly intersects the rotational axis 19 of the rotatable structure 450 and the center line 25 of the calibrated vertically-oriented symbol 21. The camera 465 (or another device to be rotated) is rigidly attached to the rotatable structure 450 so that the rotational axis 19 runs through the center of the camera 465 and the optical axis 466 of the camera 465 (or an axis of the other device to be rotated) perpendicularly intersects both the rotational axis 19 and the center line 25 of the calibrated vertically-oriented symbol 21. In such a configuration, the axis 467 is parallel to the optical axis 466 and the rotational bar code 100, the rotatable structure 450, and the camera 465 all share a rigidly-held angular orientation with respect to the rotational axis 18 of the cylindrical surface 11. In this manner, the rotational axis 19 of the rotational structure 450 and the rotational axis 18 of the cylindrical surface 11 are parallel to and overlapping with a rotational axis of the camera 465. Thus, as the axis 467 of the rotatable structure 450 angularly rotates about the rotational axis 19 from a first orientation to a second orientation, the rotational bar code 100 and the camera 465 also rotate by the same angle.

In one implementation of this embodiment, the camera 465 is the rotatable structure and the rotational bar code 100 is directly attached to the camera 465, for example, by attachment components 460 or by imprinting the vertically-oriented symbols 20 on a cylindrical portion of the camera 465 (not shown). In such an embodiment, the rotational bar code 100 and the camera 465 share an angular orientation with respect to the rotational axis 18 of the cylindrical surface 11.

The bar code scanner 500 includes a light sensor 505, at least one lens 320, and a decoder circuit 506. The lens 320 is positioned between the rotational bar code 100 and the light sensor 505. The lens 320 directs at least a portion of the light 300 reflected from the vertically-oriented symbol 22 (currently-read vertically-oriented symbol 22) on the rotational bar code 100 to the light sensor 505. The light sensor 505 generates rotational-bar-code image data based on the sensed light 300 reflected from the vertically-oriented symbol 22 (currently-read vertically-oriented symbol 22). The decoder circuit 506 is communicatively coupled via connection 512 to receive output (rotational-bar-code image data) from the light sensor 505. The decoder circuit 506 analyzes the rotational-bar-code image data provided by the light sensor 505 and sends output data indicative of at least one of the plurality of vertically-oriented symbols to the control unit 470 via the output interface 511 and connection 510.

The control unit 470 includes a processor 490, a memory 480 in a storage medium 481, software (SW) 482 in the storage medium 481, a controller 475 to control an angular orientation of the rotatable structure 450, and an optional position controller 476. The memory 480 stores information indicative of a non-periodic unique pattern 205 of vertically-oriented symbols 20 horizontally abutted on the rotational bar code 100. The memory 480 also stores information indicative of the calibrated vertically-oriented symbol 21. The software 482 includes computer readable code.

The processor 490 receives the output data from the bar code scanner 500 and sends a current-angular-orientation $\theta_{current}$ of the rotational bar code 100 to the controller 475. The currently-read vertically-oriented symbol 22 is matched to one of the vertically-oriented symbol 20 in the non-periodic unique pattern 205. Then the position of the identified currently-read vertically-oriented symbol 22 is determined relative to the calibrated vertically-oriented symbol 21. Specifically, the length of an arc from the currently-read vertically-oriented symbol 22 to the calibrated vertically-oriented symbol 21 is determined. The length of an arc from the currently-read vertically-oriented symbol 22 to the calibrated vertically-oriented symbol 21 is defined herein as the current-angular-orientation $\theta_{current}$. If the current-angular-orientation $\theta_{current}$ of the rotatable structure 450 differs from a desired orientation $\theta_{desired}$, the controller 475 sends rotational instructions to the rotatable structure 450. The desired orientation $\theta_{desired}$ is known with reference to the calibrated vertically-oriented symbol 21. The desired orientation $\theta_{desired}$ is stored in the memory 480. The rotational instructions instruct the rotatable structure 450 to angularly rotate by the required number of degrees and in the required direction (clockwise or counter clockwise) to reorient the rotatable structure 450 from the current-angular-orientation $\theta_{current}$ to the desired orientation $\theta_{desired}$. In this manner, based on the rotational instructions, the rotatable structure 450 and the rotational bar code 100 immovably positioned on the rotatable structure 450 are reoriented from a current-angular-orientation $\theta_{current}$ to desired orientation $\theta_{desired}$.

In one implementation of this embodiment, the rotational instructions are sent to the rotational bar code 100 (rather than the rotatable structure 450) to instruct the rotational bar code 100 to angularly rotate by the required number of degrees and in the required direction (clockwise or counter clockwise) to reorient the rotational bar code 100 immovably positioned on the rotatable structure 450 from the current-angular-orientation $\theta_{current}$ to the desired orientation $\theta_{desired}$.

In another implementation of this embodiment, the rotational-bar-code-sensor system 150 includes a cleaning apparatus 315 to remove debris from the rotational bar code 100. The cleaning apparatus 315 can be a brush to remove lint, dust or other particulate matter from the rotational bar code 100. The presence of dust or debris on the rotational bar code 100 can lead to a distortion of the reflected light 300 so that the currently-read vertically-oriented symbol 22 is misread by the bar code scanner 500. The cleaning apparatus 315 can also be air-movement system to blow lint, dust or other particulate matter off of the surface of the rotational bar code 100. Other types of cleaning apparatus 315 can be used.

The bar code scanner 500 can also optionally include a filter 325 positioned between the rotational bar code 100 and the light sensor 505. The light filter 325 transmits a selected frequency spectrum of the light 300 reflected from the rotational bar code 100 to the bar code scanner 500. In one implementation of this embodiment, the light filter 325 is not part of the bar code scanner 500 but is between the bar code scanner 500 and the rotational bar code 100.

In one implementation of this embodiment, there is no lens 320 in the bar code scanner 500. In this case the light sensor 505 is shaped (e.g., in an array of photodetectors) to pick up the light reflected from the "W×h" shape of the currently-read vertically-oriented symbol 22 being read. In another implementation of this embodiment, the position of the bar code scanner 500 with respect to the currently-read vertically-oriented symbol 22 being read is adjustable so that the field of view of the lens 320 includes one, two, or more than two vertically-oriented symbols 20. In this case, the control unit 470 includes a position controller 476 that is communicatively coupled (not shown) to the bar code scanner 500 to move the bar code scanner 500 towards or away from the currently-read vertically-oriented symbol 22 as required, and the bar code scanner 500 is configured to sense light 300 reflected from vertically-oriented symbols 20 within a desired field-of-view.

In another implementation of this embodiment, the non-periodic unique pattern only covers a portion of the rotational bar code 100 and the rotation of the rotational bar code 100 is constrained within an associated rotational range of less than 360 degrees. For example, if the non-periodic unique pattern covers a third of the outward-facing surface 15, then the rotational bar code 100, the rotatable structure 450 and camera 465, are limited to a rotational range of 120°.

Light source 305 is infrared (IR) source, an ultra-violet (UV) source, or a visible light source. The light source 305 can be a halogen light, a light emitting diode (LED), or an array of LEDs, organic LEDs, diode lasers (such as edge emitting lasers or VCSELs), gas lasers, or other types of light sources now known or later developed. The light sensor 505 is a sensor that is compatible to receive at least a portion of the frequency spectrum emitted by the light source 305. The light sensor is an array of light sensors, a photodiode, a large area photodiode, or other types of sensors now known or later developed. In one implementation of this embodiment, the reflected light 300 is a narrow beam of light that is scanned (rastered) across the face of a photodiode as a narrow beam of the incident light 310 (FIG. 1) is scanned up and/or down the currently-read vertically-oriented symbols 22. The lens 320 is shaped and designed as required to permit all or almost all of at least one vertically-oriented symbol 20 to be imaged on the light sensor 505.

In one implementation of this embodiment, a plurality of lenses 320 move with respect to each other so that the field of view of the lens 320 is adaptable (programmable) to image one, two, or more than two vertically-oriented symbols 22 on the light sensor 505 without moving the bar code scanner 500 in relation to rotational bar code 100. In this embodiment, the control unit 470 is configured to send instructions as needed to control the relative positions of the plurality of lenses 320. The filter 325 is shaped to intercept all or almost all of the light reflected from the vertically-oriented symbol 22 or to intercept all or almost all of the light imaged by the lens 325, depending on the relative position of the filter 325.

The processor 490 executes software 482 and/or firmware that causes the processor 490 to perform at least some of the processing described here as being performed by the control unit 470. At least a portion of such software 482 and/or firmware executed by the processor 490 and any related data structures are stored in storage medium 481 during execution. Memory 480 comprises any suitable memory now known or later developed such as, for example, random access memory (RAM), read only memory (ROM), and/or registers within the processor 490. In one implementation, the processor 490 comprises a microprocessor or microcontroller. Moreover, although the processor 490 and memory 480 are shown as separate elements in FIG. 3, in one implementation, the processor 490 and memory 480 are implemented in a single device (for example, a single integrated-circuit device). The software 482 and/or firmware executed by the processor 490 comprises a plurality of program instructions that are stored or otherwise embodied on the storage medium 481 from which at least a portion of such program instructions are read for execution by the processor 490. In one implementation, the processor 490 comprises processor support chips and/or system support chips such as application-specific integrated circuits (ASICs). In another implementation of this embodiment, the control unit is integrated within the bar code scanner 500.

Figure 4:
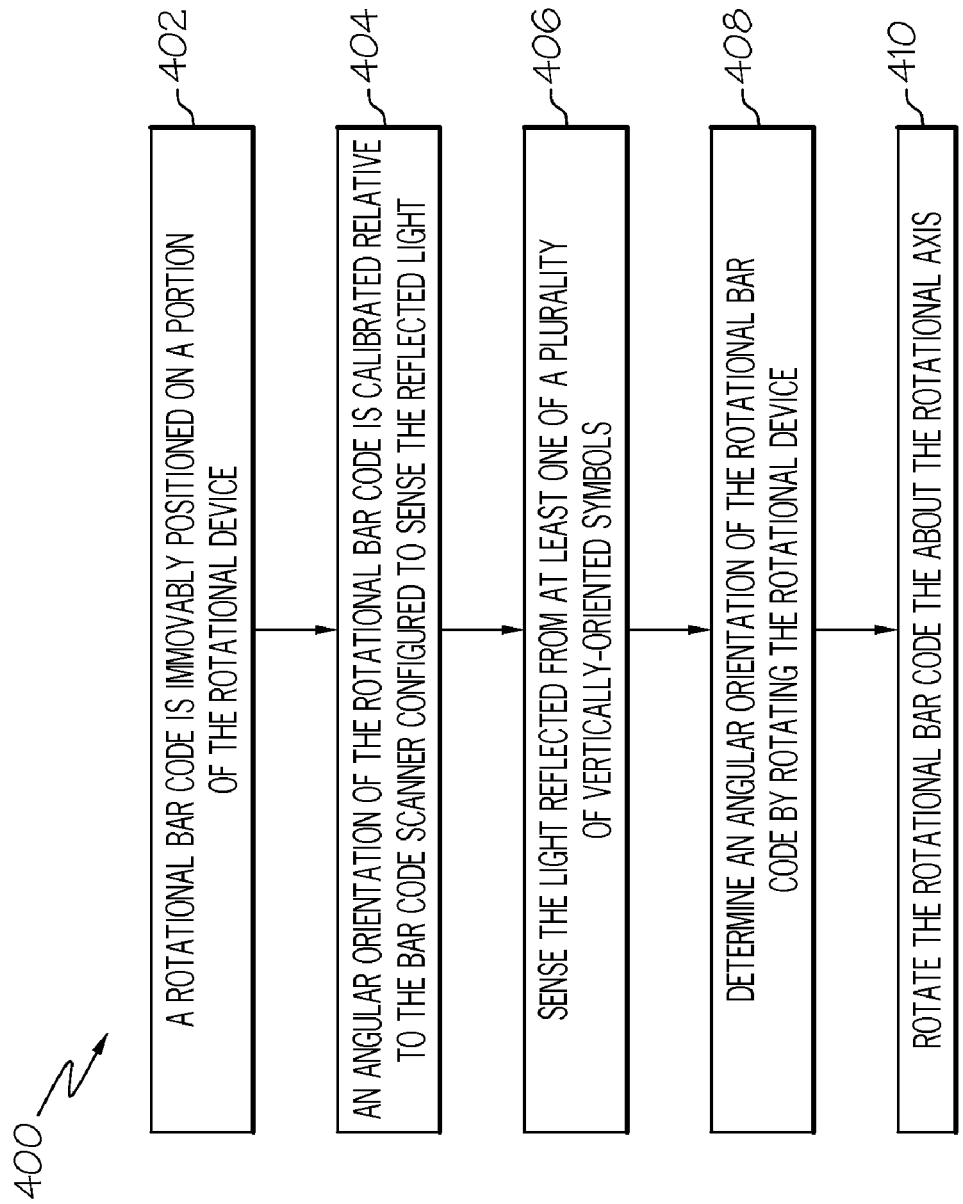
FIG. 4 is an embodiment of a method of determining an angular orientation of a rotational bar code in accordance with the present invention.

FIG. 4 is an embodiment of a method 400 of determining an angular orientation of a rotational bar code 100 in accordance with the present invention. The method 400 is described herein with reference to the rotational-bar-code-sensor system 150 of FIG. 3. In such an embodiment, at least a portion of the processing of method 400 is performed by software 482 executing on the processor 490 of the control unit 470 and/or the decoder circuit 506 in the bar code scanner 500.

At block 402, a rotational bar code 100 is immovably positioned on a portion of the rotatable structure 450 so that a rotational axis 18 of the cylindrical surface 11 is parallel to and overlaps a rotational axis 19 of the rotatable structure 450. The rotatable structure 450 includes an axis 467 that perpendicularly intersects the rotational axis 19 of the rotatable structure 450. In one implementation of this embodiment, a camera 465 rigidly attached to the rotatable structure 450 has an optical axis 466 that perpendicularly intersects the rotational axis 19 of the rotatable structure 450. The axis 467 of the rotatable structure 450 and the optical axis 466 of the camera 465 are also oriented to perpendicularly intersect a center line 25 of a calibrated vertically-oriented symbol 21 when the rotational bar code 100 is immovably positioned on a portion of the rotatable structure 450.

At block 404, an angular orientation θ of the rotational bar code 100 is calibrated relative to the bar code scanner 500 configured to sense the reflected light 300. In one implementation of this embodiment, the center line 25 to which the axis of the rotatable structure 450 (or an optical axis 466 of the camera 465) is aligned is the center line 25 of a calibrated vertically-oriented symbol 21. The information indicative of the image data of the calibrated vertically-oriented symbol 21 is stored in the memory 480 during the calibration.

At block 406, the light sensor 505 in the bar code scanner 500 senses the light 300 reflected from at least one of a plurality of vertically-oriented symbols 20 horizontally abutted in a non-periodic unique pattern 205 on one of the outward-facing surface 15 or the inward-facing surface 16 of the rotational bar code 100. The light 310 is emitted by the light source 305 to be incident on at least one currently-read vertically-oriented symbol 22. The light 300 is reflected from the currently-read vertically-oriented symbol 22 and is directed by the lens 320 on the light sensor 505. The light sensor 505 generates rotational-bar-code image data based on the sensed light 300 reflected from the currently-read vertically-oriented symbol 22. The decoder circuit 506 receives output (rotational-bar-code image data) from the light sensor 505. The decoder circuit 506 analyzes the rotational-bar-code image data provided by the light sensor 505 and sends output data indicative of at least one of the plurality of vertically-oriented symbols 22 from which the light 310 is reflected to the control unit 470.

At block 408, the controller 475 in the control unit 470 determines an angular orientation θ of the rotatable structure 450 and the rotational bar code 100 based on the sensing of the light sensor 505 and the received output data indicative of at least one of the plurality of vertically-oriented symbols 22. The determining an angular orientation θ of the rotational bar code 100 includes receiving output data indicative of at least one of the plurality of vertically-oriented symbols 22 from the bar code scanner 500, comparing the output data indicative of at least one of the plurality of vertically-oriented symbols 22 with information indicative of a non-periodic unique pattern 205 of vertically-oriented symbols 20, and generating a current-angular-orientation $θ_{current}$ of the rotational bar code 100 based on the comparison and the calibrating done in block 404 as described above with reference to FIGS. 1 and 2.

At block 410, the rotatable structure 450 and the rotational bar code 100 are rotated about the rotational axis 18 based on the current-angular-orientation $θ_{current}$ of the rotational bar code 100 that was determined at block 408. Since the rotational bar code 100 is immovably positioned on the rotatable structure 450, the rotational bar code 100 is also rotated about the rotational axes 18 and 19 based on the controlling of the rotatable structure 450. The rotating the rotational bar code 100 about the rotational axis 18 of the rotational bar code 100 includes receiving information indicative of the current-angular-orientation $θ_{current}$ of the rotational bar code 100 at a controller 475 in the control unit 470, generating rotational instructions based on the current-angular-orientation $θ_{current}$ and a desired angular orientation $θ_{desired}$ at the controller 475, and sending the rotational instructions to the rotatable structure 450 that is immovably positioned on the rotational bar code 100. The rotational instructions include a direction of rotation (clockwise or counter clockwise) and a number of degrees (radians) to rotate in order to rotate the rotational bar code 100 to the desired angular orientation $θ_{desired}$.

In one implementation of this embodiment, a rotation of the rotatable structure 450 and/or the camera 465 is stopped based on the controlling. For example, the rotation of the rotatable structure 450 and/or the camera 465 the rotational bar code continues while the light sensor 505 in the bar code scanner 500 continuously senses the light 300 reflected from at least one of a plurality of vertically-oriented symbols 20 horizontally abutted in a non-periodic unique pattern 205 until the control unit 470 determines that a pre-selected vertically-oriented symbol 20 is being sensed and then the rotation is stopped. In this manner, the rotational bar code 100 is rotated until a fixed set position is read at the bar code scanner 500.

Figure 5:
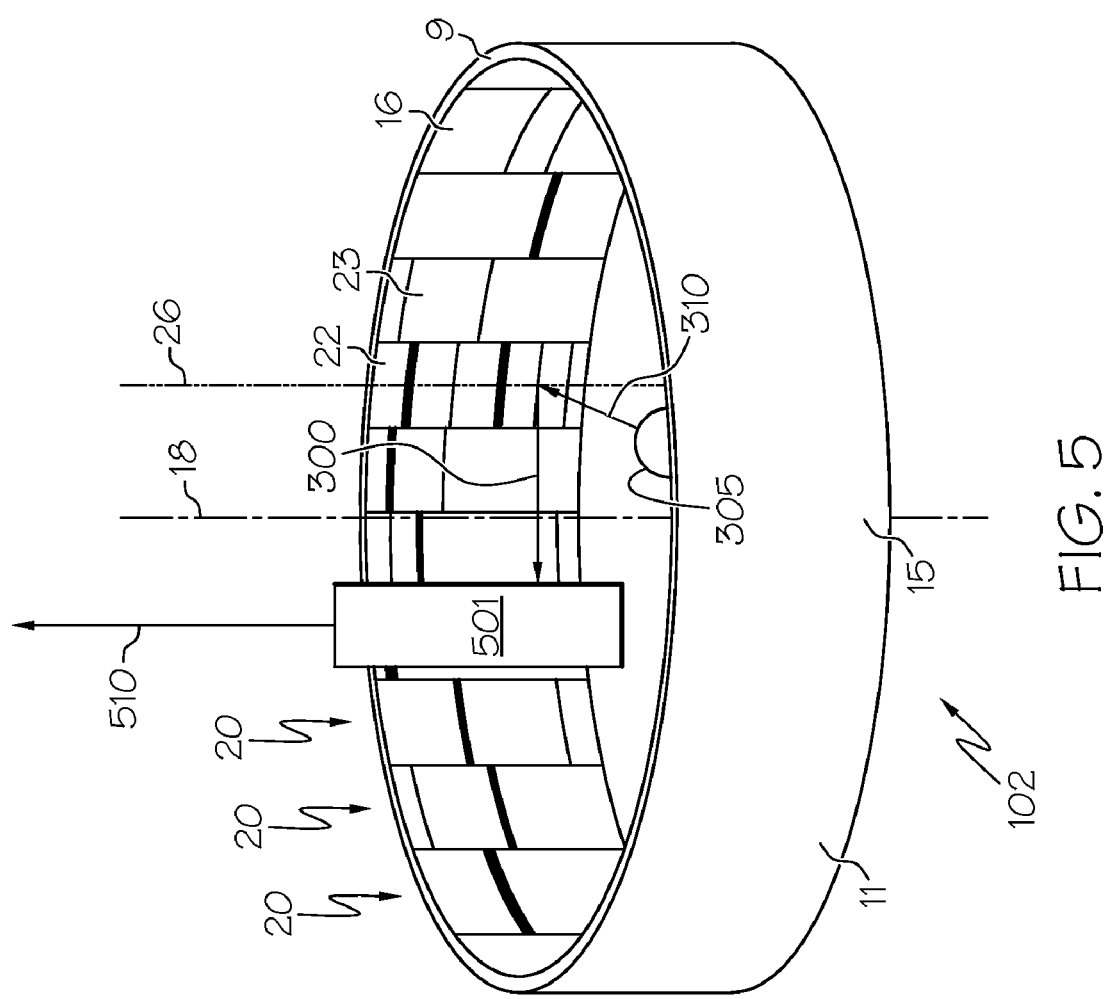
FIG. 5 is an illustration of an embodiment of a rotational bar code and bar code scanner in accordance with the present invention.

FIG. 5 is an illustration of an embodiment of a rotational bar code 102 and bar code scanner 501 in accordance with the present invention. In this embodiment, the plurality of vertically-oriented symbols 20 are horizontally abutted in a non-periodic unique pattern 205 on the inward-facing surface 16 rather than on the outward-facing surface 15 of the rotational bar code 100 of FIG. 1. The light source 305 is positioned within the cylindrical surface 11 so that at least a portion of the emitted light 310 is directed on at least a portion (e.g., currently-read vertically-oriented symbol 22) of the rotational bar code 102. The light 300 reflected from the currently-read vertically-oriented symbol 22 is directed to the bar code scanner 501.

The bar code scanner 501 is positioned to sense light 300 reflected from the inward-facing surface 16 of the cylindrical surface 11 and to output data 510 indicative of at least one of the plurality of vertically-oriented symbols 20 from which the light 310 is reflected. As shown in FIG. 5, the bar code scanner 501 reads the reflected light 300 and analyzes the image of the currently-read vertically-oriented symbol 22. In one implementation of this embodiment, the bar code scanner 501 reads two adjacent vertically-oriented symbols 22 and 23. The rotational bar code 102 and the bar code scanner 501 are operable in a similar manner as the rotational bar code 100 and the bar code scanner 500. The rotational bar code 102 and the bar code scanner 501 can be implemented in place of the rotational bar code 100 and the bar code scanner 500 shown in the rotational-bar-code-sensor system 150 of FIG. 3 as is understandable to one skilled in the art upon reading and understanding this document. As described above, an angular orientation θ of the cylindrical surface 11 is identifiable by the output data based on the pattern of the plurality of vertically-oriented symbols 22.

Figure 6:
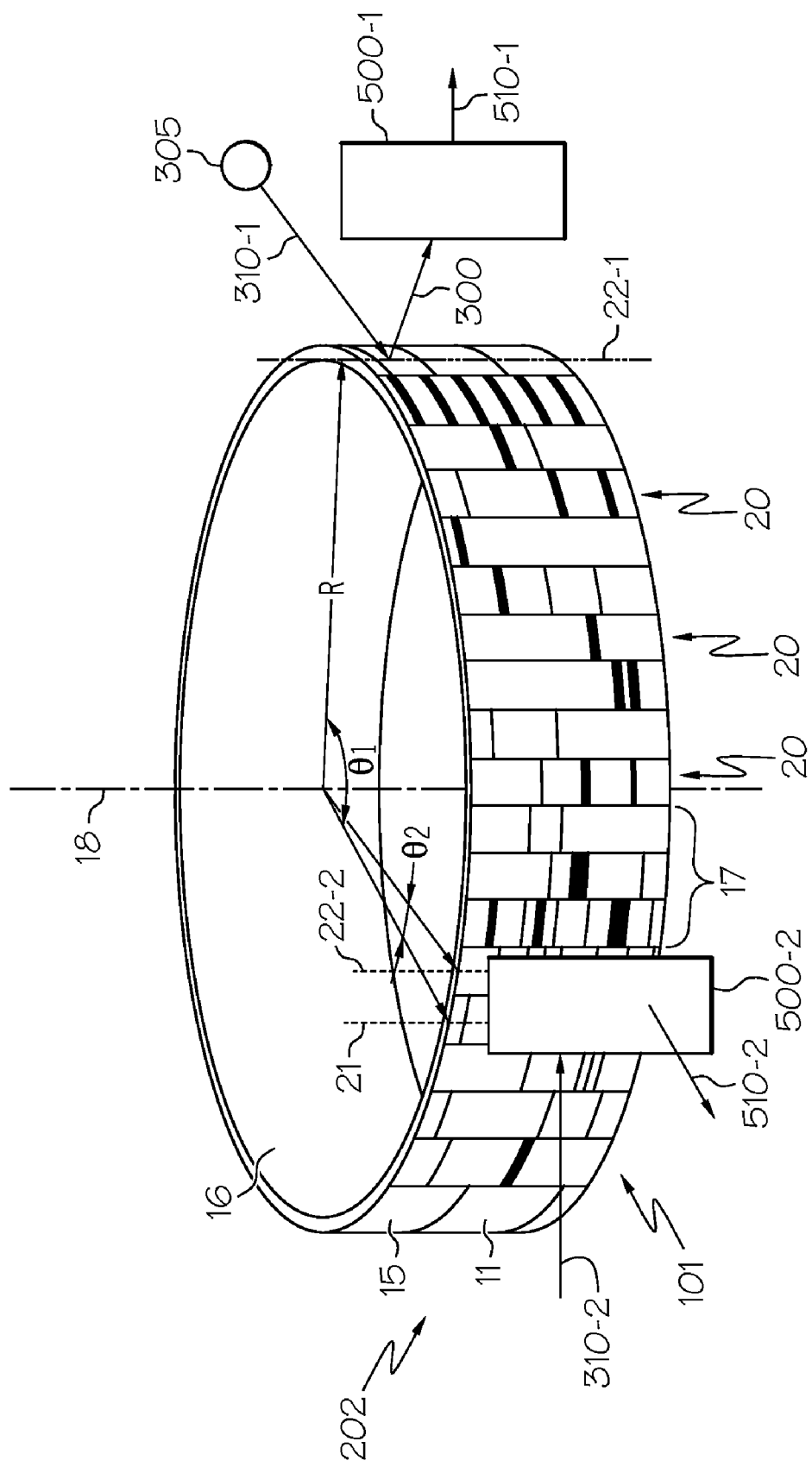
FIG. 6 is an illustration of an embodiment of a rotational bar code and two bar code scanners in accordance with the present invention.

FIG. 6 is an illustration of an embodiment of a rotational bar code 101 and two bar code scanners 500(1-2) in accordance with the present invention. As shown in FIG. 6, a first bar code scanner 500-1 and a second bar code scanner 500-2 are configured to read the non-periodic unique pattern 202 on the rotational bar code 101. As shown in FIG. 6, the first bar code scanner 500-1 reads the currently-read vertically-oriented symbol 22-1 while the second bar code scanner 500-2 reads the currently-read vertically-oriented symbol 22-2. The first bar code scanner 500-1 and the second bar code scanner 500-2 are operably positioned relative to each other and relative to the cylindrical surface 11 to identify the angular orientation θ of the cylindrical surface 11. In one implementation of this embodiment, two bar code scanners 500(1-2) are used when the non-periodic unique pattern includes some duplicated vertically-oriented symbols 20. In another implementation of this embodiment, two bar code scanners 500(1-2) are used to provide redundancy when all vertically-oriented symbols 20 are unique. In this case, the second bar code scanner 500-2 is at a known angular offset from the first bar code scanner 500-1.

In yet another implementation of this embodiment, the rotational bar code 101 includes two layers of the vertically-oriented symbols 20. In this case, a first ring of vertically-oriented symbols 20 is centered on a first position of the rotational axis 18 and a second ring of vertically-oriented symbols 20 is centered on a second position of the rotational axis 18, the second position being vertically offset from the first position. In this case, the first bar code scanner 500-1 reads the first ring of vertically-oriented symbols 20 and the second bar code scanner 500-2 reads the second ring of vertically-oriented symbols 20.

Figure 7:
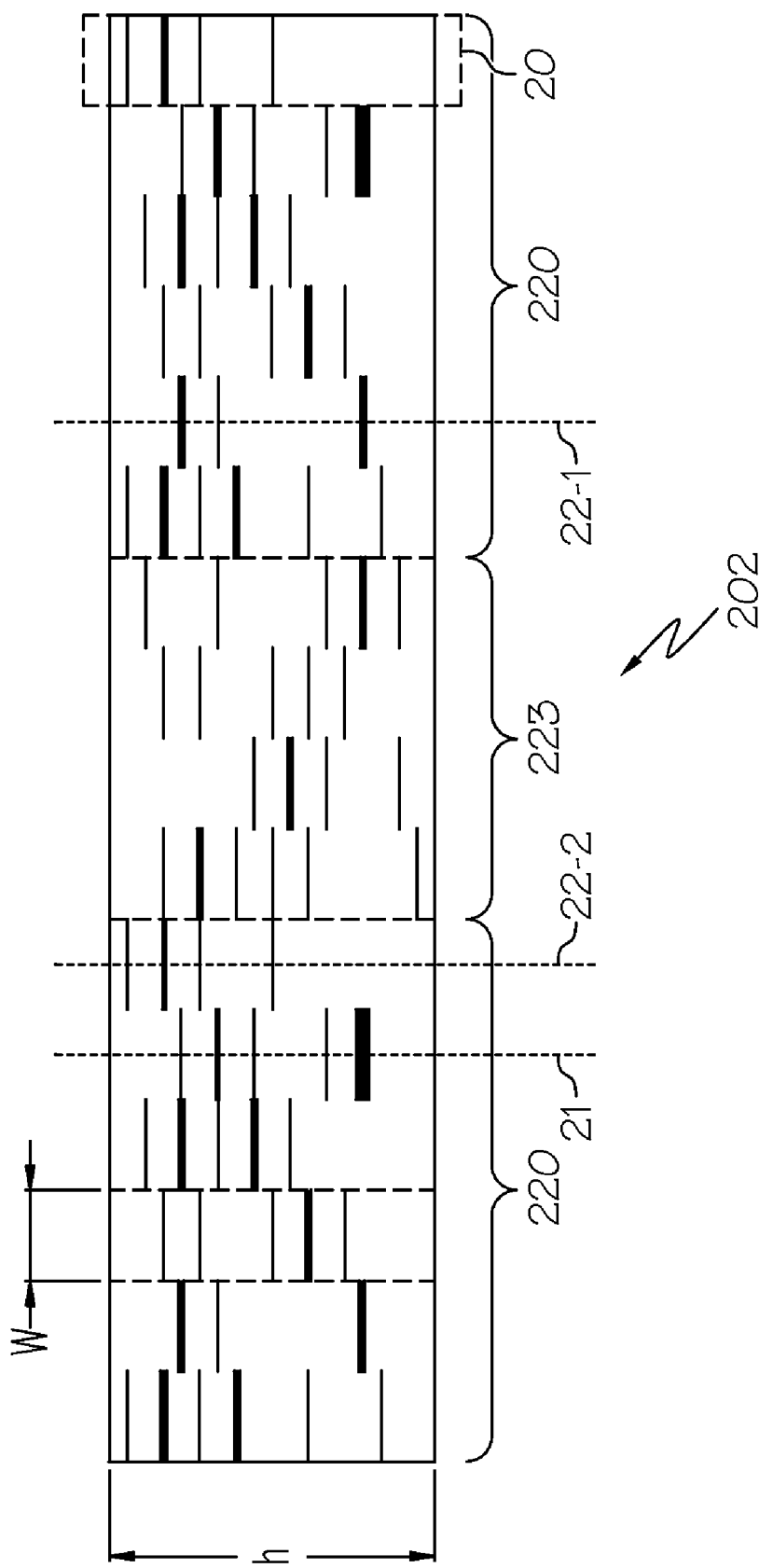
FIG. 7 is an exemplary non-periodic unique pattern for use on the rotational bar code of FIG. 6.

FIG. 7 is an exemplary non-periodic unique pattern 202 for use on the rotational bar code 101 of FIG. 6. The non-periodic unique pattern 202 is shown on a flat surface for ease of viewing. Each vertically-oriented symbol 20 is as described above with reference to FIG. 2. The plurality of vertically-oriented symbols 20 are horizontally abutted in a non-periodic unique pattern 202 on one of the outward-facing surface 15 (as shown in FIG. 6) or the inward-facing surface 16 (as shown in FIG. 5). As shown in FIG. 7, the sets 220 of vertically-oriented symbols 20 in the non-periodic unique pattern 202 include a plurality of vertically-oriented symbols 20 that are identically duplicated. The segment of the vertically-oriented symbols 20 that includes vertically-oriented symbols 20 that are not duplicated is referred to herein as the predefined segment 223 of the arc 17 of the rotational bar code 101 (FIG. 6). The vertically-oriented symbols 20 are unique for at least a predefined segment 223 of an arc of the cylindrical surface 11. In one implementation of this embodiment, the predefined segment 223 of the arc of the cylinder surface 11 is more than 30% of the complete 360° arc.

As shown in FIG. 6, the calibrated vertically-oriented symbol 21-1 is angularly orientated with the currently-read vertically-oriented symbol 22-1 by the angle $\theta_1$. The calibrated vertically-oriented symbol 21-2 is angularly orientated with the currently-read vertically-oriented symbol 22-1 by the angle $\theta_2$. Two angles are required since at least one of the vertically-oriented symbols 20 is duplicated. For the configuration shown in FIG. 6, the angular relationship between the first bar code scanner 500-1 and the second bar code scanner 500-2 with respect to the rotational bar code 101 is $(\theta_2-\theta_1)$. This known angular relationship is stored in the memory 480 of the control unit 470 (FIG. 3).

In one implementation of this embodiment, the two bar code scanners 500(1-2) are used with the non-periodic unique pattern 202 (FIG. 7) in a rotational-bar-code-sensor system, such as the rotational-bar-code-sensor system 150 of FIG. 3. The orientation of the optical axis 466 of the camera 465 (FIG. 3) can be determined based on: 1) the output data 510-1 indicative of the vertically-oriented symbols 22-1 from which the light 310-1 is reflected; 2) the output data 510-2 indicative of the vertically-oriented symbols 22-2 from which the light 310-2 is reflected; 3) the angular relationship between the first bar code scanner 500-1; and the second bar code scanner 500-2 with respect to the rotational bar code 101, and 4) the pattern of the non-periodic unique pattern 202 stored in memory 480, as is understandable to one skilled in the art upon reading and understanding this document.

In another implementation of this embodiment, two bar code scanners 500(1-2) are used with the non-periodic unique pattern 205 in which every one of the plurality of vertically-oriented symbols 20 is unique in order to provide a back up and/or to improve confidence in the rotational-bar-code-sensor system in which the two bar code scanners 500(1-2) are implemented.

In one implementation of this embodiment, fewer than fifty percent of the vertically-oriented symbols 20 are duplicated in the non-periodic unique pattern 202. In another implementation of this embodiment, at least one of the vertically-oriented symbols 20 is duplicated at least once in the non-periodic unique pattern 202. In yet another implementation of this embodiment, at least one of the plurality of vertical bar codes is duplicated once in the non-periodic unique pattern 202. In yet another implementation of this embodiment, more than two of the vertical bar codes are duplicated once in a random pattern and the duplicated vertical bar codes are separated by at least a pre-selected number of vertical bar codes 20 in the non-periodic unique pattern 202.

Embodiments of the rotational-bar-code-sensor systems described herein can be used to accurately determine the orientation of an optical axis of a camera (or other device to be rotated) attached to a rotatable structure.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An apparatus for detecting a rotational bar code comprising:
a rotatable structure at least a portion of which includes a cylindrical surface having at least one of an outward-facing surface and an inward-facing surface, the surfaces radially disposed about a rotational axis of the cylindrical surface;

a plurality of vertically-oriented symbols horziontally abutted in a non-periodic unique pattern on one of the outward-facing surface or the inward facing surface, wherein the vertically-oriented symbols are unique for at least a predefined segment of an arc of the cylindrical surface;

at least one bar code scanner positioned to sense at least a portion of light reflected from the cylindrical surface, the bar code scanner operable to output data indicative of at least one of the plurality of vertically-oriented symbols from which the light is reflected; and a camera rigidly attached to the rotatable structure, wherein the rotatable structure and the camera have rotational axes aligned with the rotational axis of the cylindrical surface so that an optical axis of the camera perpendicularly intersects the aligned rotational axes and a center line of a calibrated vertically-oriented symbol, wherein the rotatable structure and the camera share a rigidly-held angular orientation with respect to the rotational axis of the cylindrical surface, wherein an angular orientation of the cylindrical surface and an orientation of the optical axis of the camera are identifiable by the output data.

2. The apparatus of claim 1, wherein the output data comprises at least one of pulse width modulated data, resistive level data, voltage level data, parallel digital data indicative of two adjacent vertically-oriented symbols, and serial data indicative of a single vertically-oriented symbol.

3. The apparatus of claim 1, wherein the at least one bar code scanner is one bar code scanner and wherein the non-periodic unique pattern is a pattern in which every one of the plurality of vertically-oriented symbols is unique.

4. The apparatus of claim 1, wherein the at least one bar code scanner comprises a first bar code scanner and a second bar code scanner, and wherein the non-periodic unique pattern is a pattern in which fewer than fifty percent of the plurality of vertically-oriented symbols are duplicated, wherein the first bar code scanner and the second bar code scanner are operably positioned relative to each other and relative to the cylindrical surface to identify the angular orientation of the cylindrical surface.

5. The apparatus of claim 1, wherein each vertically-oriented symbol comprises at least one horizontal line segment, the length of each horizontal line segment being the width of the vertically-oriented symbol, and each of the horizontal line segments having one of a plurality of widths.

6. The apparatus of claim 1, wherein the non-periodic unique pattern is a pattern in which at least one of the plurality of vertically-oriented symbols is duplicated at least once.

7. A rotational-bar-code-sensor system comprising:
a rotational bar code immovably positioned on a rotatable structure, the rotational bar code having a plurality of vertically-oriented symbols horizontally abutted in a non-periodic unique pattern on a cylindrical surface, wherein the rotational bar code and the rotatable structure have aligned rotational axes;

a bar code scanner positioned to sense at least a portion of light reflected from at least one of the plurality of vertically-oriented symbols;

a control unit to receive output from the bar code scanner, to identify an angular orientation of the rotational bar code based on the received output, and to output rotational instructions to rotate the rotatable structure to a desired angular orientation and a camera rigidly attached to the rotatable structure so that an optical axis of the camera perpendicularly intersects the aligned rotational axes and a center line of a calibrated vertically-oriented symbol, wherein the rotational bar code, the rotatable structure, and the camera share a rigidly-held angular orientation with respect to a rotational axis of the cylindrical surface, wherein an orientation of the optical axis of the camera is determined.

8. The rotational bar code sensor system of claim 7, wherein the rotational bar code comprises:
a structure at least a portion of which includes the cylindrical surface having at least one of an outward-facing surface and an inward-facing surface, the surfaces radially disposed about a rotational axis of the cylindrical surface; and a plurality of vertically-oriented symbols horizontally abutted in a non-periodic unique pattern on one of the outward-facing surface or the inward facing surface, wherein the vertically-oriented symbols are unique for at least a predefined segment of an arc of the cylindrical surface, wherein an angular orientation of the cylindrical surface is identifiable based on the plurality of vertically-oriented symbols.

9. The rotational-bar-code-sensor system of claim 7, further comprising a light source positioned to emit light directed on at least a portion of the rotational bar code.

10. The rotational-bar-code-sensor system of claim 7, wherein the bar code scanner comprises:
a light sensor to generate rotational-bar-code image data based on the sensed light;

a lens positioned between the rotational bar code and the light sensor, the lens being configured to direct at least a portion of the light reflected from the at least a portion of the rotational bar code to the light sensor; and a decoder circuit communicatively coupled to the light sensor, the decoder circuit operable to analyze the rotational-bar-code image data provided by the light sensor and to send output data indicative of at least one of the plurality of vertically-oriented symbols to the control unit.

11. The rotational-bar-code-sensor system of claim 10, wherein the bar code scanner further comprise a light filter positioned between the rotational bar code and the light sensor, the light filter being configured to transmit a selected frequency spectrum of the light reflected from the at least a portion of the rotational bar code to the bar code scanner.

12. The rotational-bar-code-sensor system of claim 7, further comprising a cleaning apparatus to remove debris from the rotational bar code.

13. The rotational-bar-code-sensor system of claim 7, wherein the control unit comprises:
a memory storing information indicative of a non-periodic unique pattern of vertically-oriented symbols horizontally abutted on the rotational bar code;

a processor configured to receive output from the bar code scanner and to send a current-angular-orientation of the rotational bar code to a controller based on the output from the bar code scanner and the non-periodic unique pattern; and the controller to send rotational instructions to the rotatable structure based on a correlation between the received output and the information indicative of a non-periodic unique pattern of vertically-oriented symbols, wherein the rotational bar code is reoriented based on the rotational instructions from a current-angular-orientation to desired orientation.

14. A method of determining an angular orientation of a rotational bar code, the method comprising:
- immovably positioning the rotational bar code having a plurality of vertically-oriented symbols horizontally abutted in a non-periodic unique pattern on one of an outward-facing surface or an inward-facing surface on a rotatable structure, wherein the rotational bar code and the rotatable structure have aligned rotational axes;
- rigidly attaching a camera to the rotatable structure so that an optical axis of the camera perpendicularly intersects the aligned rotational axes and a center line of a calibrated vertically-oriented symbol, wherein the rotational bar code, the rotatable structure, and the camera share a rigidly-held angular orientation with respect to the aligned rotational axes;
- sensing light reflected from at least one of the plurality of vertically-oriented symbols of the rotational bar code at a bar code scanner;
- determining the angular orientation of the rotational bar code and an orientation of the optical axis of the camera based on the sensing.

15. The method of claim 14, further comprising rotating the rotational bar code about the rotational axis of the rotational bar code based on the determining.

16. The method of claim 15, wherein the determining an angular orientation of the rotational bar code based on the sensing comprises:
- receiving output data indicative of at least one of the plurality of vertically-oriented symbols from the bar code scanner;
- comparing the output data indicative of at least one of the plurality of vertically-oriented symbols with information indicative of the non-periodic unique pattern of vertically-oriented symbols; and
- generating a current-angular-orientation of the rotational bar code based on the comparing.

17. The method of claim 16, wherein the rotating the rotational bar code comprises:
- receiving information indicative of the current-angular-orientation of the rotational bar code;
- generating rotational instructions based on the current-angular-orientation and a desired angular orientation; and
- sending the rotational instructions to a rotatable structure on which the rotational bar code is immovably positioned.

18. The method of claim 14, further comprising calibrating an angular orientation of the rotational bar code relative to the bar code scanner configured to sense the reflected light, wherein the generating the current-angular-orientation of the rotational bar code is based on the calibrating.

* * * * *